INVENTORS
Jaroslav Toifl, Miloslav Martinek
BY
Richard Low
Ag't

INVENTORS
Jaroslav Toifl, Miloslav Martinek
BY

United States Patent Office 3,439,336

Patented Apr. 15, 1969

3,439,336
DIGITAL COMPARATOR

Jaroslav Toifl and Miloslav Martínek, Prague, Czechoslovakia, assignors to Vyzkumny ustav matematickych stroju, Prague, Czechoslovakia Filed Sept. 29, 1965, Ser. No. 491,204
Int. Cl. G06f 7/02
U.S. Cl. 340—146.2 6 Claims

ABSTRACT OF THE DISCLOSURE

A pulse generator for producing first and second like pulse trains of the same frequency 180° displaced in phase with respect to each other supply such pulse trains to a servosystem for producing first and second command pulse trains in phase with the second and first pulse trains which represent positive and negative sense movement information. The first pulse train is supplied to a first single directional counter and is supplied to a second single directional like counter through an addition stage and a subtraction stage in series connection. The outputs of the first and second counters are supplied to a flip-flop whose output is supplied to the movement control of the servosystem. First and second feedback pulse trains are produced which are in phase with the first and second pulse trains and represent positive and negative sense deviation movement information. The first command and first feedback pulse trains are supplied to the subtraction stage and the second command and second feedback pulse trains are supplied to the addition stage.

This invention relates to digital comparators. More particularly, it relates to digital comparators suitable for use in digital servomechanisms for controlling machine tools and for actuating feed movements in accordance with chosen values of coordinates.

Such control systems generally include digital-incremental-odometric systems and in known arrangements, reversible counters are employed in the digital comparators provided therein, the numerical contents of the counters and their sense (positive or negative) determining the degree and direction of a deviation from a desired value. It is evident that counters which operate in both directions, i.e., up and down or reversible counters, are much more expensive and complicated than the relatively simple single directional counters.

Accordingly, it is an important object of this invention to provide a digital comparator, particularly for use in a digital servosystem, wherein the need for employing reversible counters is eliminated, and wherein single directional counters may be used in their stead.

This object is achieved by providing a digital comparator in which at least two unidirectional counters are utilized in the comparator. One of the counters functions as a reference counter and the other of the counters operates as an operational, i.e., a function or deviation counter. The outputs of both of the aforesaid counters are applied as inputs to a flip-flop circuit, the output of which controls the functional section of a servomechanism. The reference counter has applied directly thereto the output of a pulse source and the output of said pulse source is also applied to said operational counter through an addition stage and a subtraction stage. Two categories of pulses are fed to the addition and subtraction stages in order to modify the count in the operational counter in the positive or the negative sense, i.e., the pulses fed to the addition and subtraction stages represent servomotion information, for example. The number of operational counters which are required depends upon the number of discrete types of magnitudes which are to be dealt with. Thus, for example, where a coordinate type drawing table is to be controlled in which discrimination has to be made between two measured quantities, viz, X and Y coordinates, the comparator need only comprise two operational counters. Where, for example, discrimination has to be made between more than two quantities, a number of operational counters have to be provided equal to the number of discrete types of quantities being measured.

Generally speaking and in accordance with the invention, there is provided in a servomechanism for controlling movement in utilization apparatus and which comprises command means for producing pulses representing desired movement and position information, feedback means for producing an error signal representing a deviation from the desired information and output movement control means, a pulse generator for producing first and second like pulse trains of the same frequency and 180° displaced in phase with respect to each other. Means are included for applying the outputs of the pulse generator to the command means for producing first and second command pulse trains respectively in phase with the second and first pulse trains respectively and which represent positive and negative sense movement information. There are provided first and second like single directional counters, and addition stage, a subtraction stage, and means for applying the first pulse train to the first counter and for applying the first pulse train to the second counter through the series arrangement of the subtraction and addition stages. A flip-flop circuit is included to which there are applied the outputs of the counters to produce an output from the counter in accordance with the inputs thereto. The output of the flip-flop is applied to the movement control means. Means are included responsive to the movement control means for producing first and second feedback pulse trains respectively in phase with the first and second pulse trains and which respectively represent positive and negative sense deviation movement information and means are provided for applying the first command and first feedback pulse trains to the subtraction stage and for applying the second command and second feedback pulse trains to the addition stage.

For a better understanding of the invention together with other and further objects thereof, reference is made to the following description taken in connection with the accompanying drawing and its scope is pointed out in the appended claims.

In the drawings, FIG. 1 is a block diagram of a servomechanism suitably employing therein a digital comparator constructed in accordance with the principles of the invention;

Figure 1:
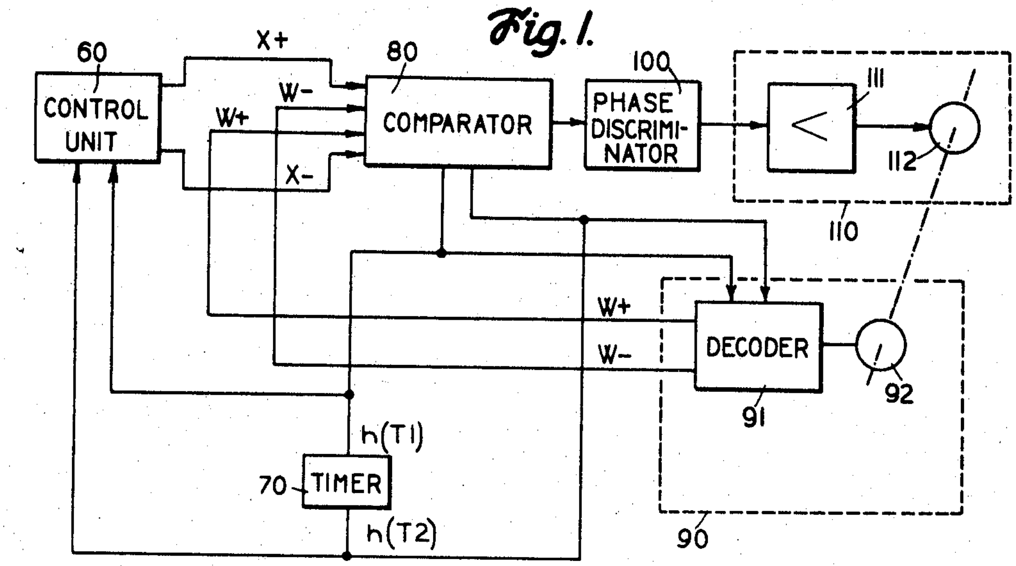

Referring now to FIG. 1 wherein there is shown a closed loop circuit arrangement illustrating the principles of the invention, the command stage of control unit 60 has applied thereto the two pulse train outputs $h(T1)$ and $h(T2)$ from timer 70. The control unit 60 may comprise any suitable source of control signals such as, for example, a magnetic or perforated tape, a punched card, or any suitable memory, storage, or the like having recorded control or command signals. Timer 70 may suitably be a pulse generator for producing two pulse trains whose pulses respectively are staggered with relation to each other by half a cycle, i.e., pulses T1 and T2 are 180° displaced in phase with respect to each other. Pulse trains h(T1) and h(T2) are also both applied to an odometric device or path of travel measuring device conceptually depicted by dashed line box 90.

The control unit 60 may comprise any suitable source of control signals such as, for example, a magnetic tape having magnetically recorded control signals, a perforated tape, a punched card, or any suitable memory, storage, or the like having recorded command signals. The control unit 60 may thus comprise a record medium and a reader such as, for example, a card reader, a high-speed reader, a magnetic-tape reader or a paper-tape reader, all known in the art and defined on pp. 259 and 260 of a publication entitled "Computer Dictionary and Handbook" by Charles J. Sippl, 1st ed., 1966, Howard W. Sams & Co., Inc., The Bobbs-Merrill Company, Inc., Indianapolis and New York, a read/write head defined on p. 261 of said publication and a writer which functions as defined on p. 345 of said publication. The input lines of FIG. 1 to the control unit 60 are connected to either a writer or a read/white head and the output lines of said figure from said control unit are connected to either a reader or said read/write head.

A suitable control unit is manufactured by the International General Electric Company, Lttd., of New York as the Mark Century 100L equipment. The connection of the control unit 60 into the remainder of the system is indicated in the literature of the International General Electric Company relating to such equipment.

Figure 7:
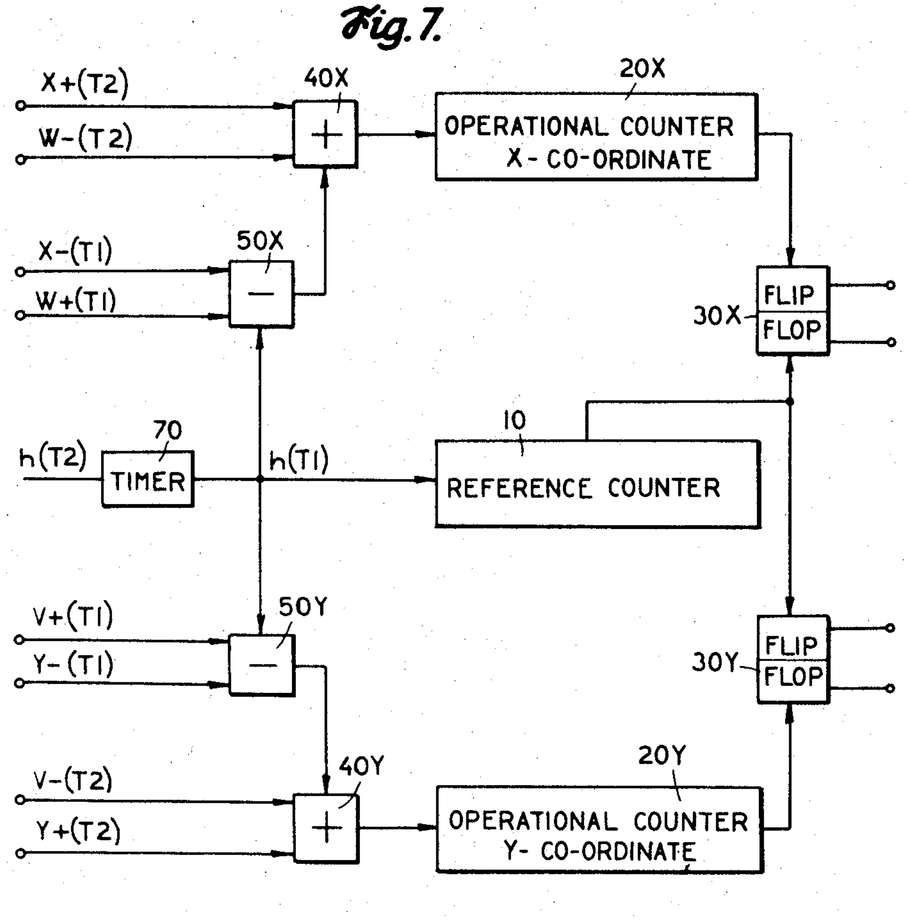
FIG. 7 shows another embodiment of a comparator made in accordance with the invention.

The control unit 60 provides a plurality of pulses in one or more trains, which are indicated by X+ and X− in FIG. 1 and X+, Y+, X− and Y− in FIG. 7, and which direct the movement of a tool or the like. of the servosystem in X axis direction or in Y axis direction. Thus, the control unit 60 may comprise a tape memory of any suitable known type which records and subsequently provides a pulse or signal X+ for movement of a tool a predetermined increment such as, for example, 0.05 mm., in the positive direction of the X axis and a pulse X− for movement of the tool the predetermined increment in the negative direction of the X axis, a pulse Y+ for movement of the tool the predetermined increment in the positive direction of the Y axis and a pulse Y− for movement of the tool the predetermined increment in the negative direction of the Y axis.

Control unit 60, through a comparator stage 80 and a phase discriminator stage 100 controls the output stage of the servo loop, such stage being shown in the arrangement of FIG. 1 as a dashed line box 110. Output stage 110 suitably comprises, among the structures included therein, an amplifier 111 and a servomotor 112. Thus, if the system depicted in FIG. 1 is being employed for the control of a machine tool, for example, servomotor 112 when actuated to be rotated, will cause a corresponding relative motion between the tool and a workpiece. The movement of servomotor 112 is transmitted by a mechanical connection to a measuring transducer 92 included in odometric device 90 as indicated by the mechanical connection line between servomotor 112 and transducer 92, the motion of transducer 92 causing the production of return pulses. A decoder stage 91 is included in odometric device 90 for discriminating between the respective directions of the movements which result in the production of return pulses, i.e., the pulse outputs W− and W+. The pulses W+ and W− are applied to comparator stage 80 together with the pulses X+ and X− produced at the output of control unit 60.

In considering the operation of the arrangement of FIG. 1, the pulses X+ and X− fed to comparator stage 80 represent the desired values or degrees of movement. The pulses W+ and W− represent the actual values as measured in the return coupling loop. The counts of the X and W pulses and their sense are compared in the comparator stage 80 and the resulting difference between their amounts is applied to phase discriminator 100. In phase discriminator 100, the output from comparator 80 is translated to amplitude modulation information for the control signals applied to output stage 110 of the servo loop. Generally, in accordance with the invention, comparator 80 together with the system in which it is included, i.e., that shown in FIG. 1, produces an output signal in response to the application thereto of two series of pulses which at all instants represents information as to the state of the count of both series of pulses.

Figure 2:
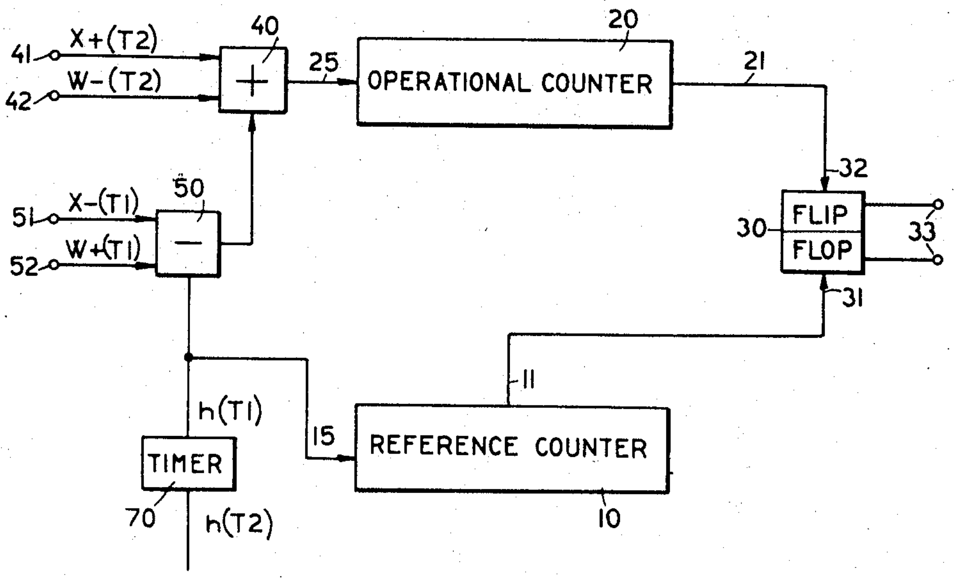
FIG. 2 is a block diagram of an illustrative embodiment of a comparator according to the invention.

In FIG. 2, there is shown a block diagram of an illustrative embodiment of a comparator constructed in accordance with the principles of the invention for comparing the counts of two pulse trains respectively comprising pulses X and W. Essentially, the basic components in the comparator of FIG. 2 are two unidirectional counters, viz., a reference counter 10 and an operational counter 20. Reference counter 10 has fed thereto at its input the pulse train h(T1) output from timer 70. The frequency of the output from timer 70 has to be chosen to be the same as that of the pulse trains comprising the X and W pulses respectively.

Figure 3:
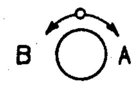
FIG. 3 shows conceptually a convenient convention for indicating movements in the positive and negative sense.

Connected in series arrangement beween the h(T1) output of timer 70 and the input to operational counter 20 are a subtraction stage 50 and an addition stage 40. Applied to addition stage 40 are the X+ pulses, i.e., those control pulses of the positive sense in phase with the pulses of pulse train T2 and the W− pulses, the decoded return pulses of the negative sense in phase with the pulses of pulse train T2. Applied to subtraction stage 40 are the X− pulses, i.e., the control pulses of the negative sense, in phase with the pulses of pulse train T1 and the W+ pulses, i.e., the return pulses of the positive sense in phase with the pulses of train T1. The h(T1) train of pulses is also applied as an input to subtraction stage 50. The pulse directions are shown in FIG. 3 by the arrows A and B, the movement of the servomechanism in the directions of arrows A and B being taken as positive and negative respectively.

Reference counter 10 and operational counter 20, which may both suitably be straight binary or binary coded decimal counters, are arranged so that they count in synchronism. In other words they are in the same count state when no signals appear at inputs 41, 42, 51 and 52. When a pulse X+ or W− arrives at inputs 41 and 42 respectively of addition stage 40, such pulse occurs between two pulses of the h(T1) pulse train phase and is fed in the phase of pulse train h(T2) via conductor 25 to operational counter 20. Upon being pulsed by the latter pulse, counter 20 will now have a setting with the value $n+1$ whereas the reference counter will have a setting with the value $n$.

When a pulse X− or W+ appears at inputs 51 and 52 of subtraction stage 50, a pulse is subtracted from the pulse train h(T1) since an X− or a W+ pulse occurs in phase with a corresponding pulse in train h(T1). Consequently, the pulse train input to operational counter 20 is decreased by one pulse. Thus, at the point that there is not a pulse input to operational counter 20, its setting value becomes $n-1$ with relation to a corresponding setting value in reference counter 10 of $n$. It is, accordingly, seen that with this arrangement the relative settings of counters 10 and 20 give a comparison between the values of the first and second, i.e., the X and W pulses not only with regard to the respective sizes of the counts but also as to direction, i.e., sense of movement. When the comparator is employed in a servo loop, the relative settings of counters 10 and 20 represent the amount and direction of a deviation of a desired position (difference between desired and actual values).

It is thus seen that, as hereinbefore described with reference to FIG. 1, the pulses X+ and X− which represent the desired magnitudes of movement, as recorded in the control unit 60, are fed to the comparator stage 80. The pulses W+ and W−, which represent the actual values, as measured in the return coupling loop, are also fed to the comparator stage. The counts of the X and W pulses and their sense are compared in the comparator stage 80 and a resultant difference between such counts is applied to the phase discriminator 100. The phase discriminator 100 translates the output of the comparator stage 80 to amplitude modulation information for the control signals applied to the output stage 110 of the servo loop.

The comparator stage 80, as hereinbefore described with reference to FIG. 2, compares the counts of the two pulse trains of pulses X and W. The pulse train *h*(T1) output from the timer 70 is supplied to the subtraction stage 50. Either the X+ pulse or the W− pulse of the pulse train T2 is added in the addition stage 40 to the *h*(T1) pulse train. The subtraction stage 50 subtracts either the X− or the W+ pulse of the pulse train T1 from the *h*(T1) train of pulses.

Thus, as hereinbefore described with reference to FIG. 2, when an X+ or W− pulse is supplied to the inputs 41 and 42 of the addition stage 40, such pulse occurs between two pulses of the *h*(T1) pulse train phase and is fed to the operational counter 20 in the phase of the *h*(T2) pulse train. When an X− or W+ pulse is supplied to the inputs 51 and 52 of the subtraction stage 50, a pulse is subtracted from the *h*(T1) pulse train and the pulse train input to the operational counter 20 is decreased by one pulse.

Figure 4:
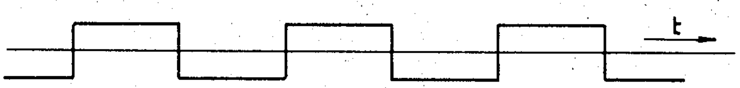
FIGS. 4 to 6 are examples of waveforms appearing at the output of the comparator shown in FIG. 2.

In order to be able to represent the relative settings of the two counters in practicably utilizable signal outputs, the outputs 11 and 21 of reference counter 10 and operational counter 20 respectively are applied as inputs to a flip-flop 30. The times of occurrences of outputs 11 and 21 are so staggered relative to each other that flip-flop 30 is actuated alternately thereby when reference counter 10 and operational counter 20 are pulsed in synchronism by the pulses from the timer 70 which are displaced 180° in phase from each other. Where the relative movement, as represented by the settings in counters 10 and 20, is zero, the reciprocal relation, i.e., the time relation of the set and reset states at the output of flip-flop 30, is 1:1. Such 1:1 reciprocal relation is shown in FIG. 4 wherein it is seen that the positive going and the negative going portion of each cycle in the output rectangular waveform of flip-flop are equal.

Figure 5:
Figure 6:
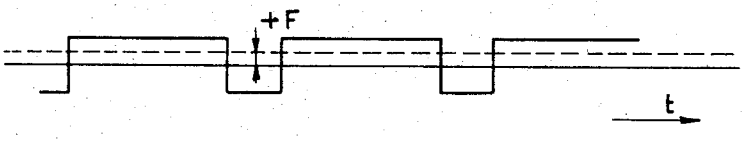

The foregoing reciprocal relation varies in one direction or the other depending upon whether there is an augmenting or a diminishing of the count in operational counter relative to the count in reference counter 10. Thus, FIG. 5 shows a situation whereby there is a reciprocal relation of 1:3 in the output waveform of flip-flop 30, the flip-flop is in one of its states for one-fourth of a cycle and in the opposite state for three-fourths of a cycle. FIG. 6 illustrates a situation where the reverse of the situation represented by FIG. 5 holds true, i.e., a reciprocal relation of 3:1. The signal F is employed as representing a measurable quantity for the reciprocal relation and is defined as the mean value of the function of the output signal of flip-flop 30. It is seen in FIG. 4 that, since the mean value line coincides with the center line, the error signal thereat has zero value. In FIG. 5, the mean value as represented by the dashed line deviates from the center line in the negative direction and in FIG. 6, the mean value as represented by the dashed line deviates from the center line in the positive direction. Error signal F is thus negative for reciprocal relations 1:*n* where *n* is greater than 1 and is positive for reciprocal relations *n*:1 where *n* is greater than 1.

In the embodiment of the servomechanism shown in FIG. 1 using a comparator such as is depicted in FIG. 2, the error signal F representing the deviation is applied to output stage 110 in the servo loop through phase discriminator 100 from the output connections 33 in comparator stage 80.

In the event that it is desired to compare, concurrently, the counts of several pairs of X and W pulse trains, i.e., several servomechanisms are simultaneously operated such as when several machine tools are controlled in several coordinates, for example, a common reference counter may be utilized in accordance with the invention in conjunction with all of the operational counters which are required. In other words, a comparator arrangement for *n* coordinates requires only *n*+1 unidirectional counters.

In FIG. 7, there is shown a comparator system constructed according to the invention for controlling the movements of a coordinate drawing table where the desired values of one coordinate are represented by X+ and X−, the desired values of the other coordinate are represented by Y+ and Y− and the actual value of the other coordinate are represented by V+ and V−. Actually in FIG. 7, addition stage 40X, subtraction stage 50X, timer 70, reference counter 10, operational counter 20X and flip-flop 30X comprise a comparator such as shown in FIG. 2 and timer 70, reference counter 10, subtraction stage 50Y, addition stage 40Y and operational counter 20Y also comprise a comparator such as is shown in FIG. 2. The arrangement of FIG. 7 operates as two independent comparators, the counters therein all being cycled in synchronism.

In addition to providing the advantage of enabling the use of only simple unidirectional counters, comparators constructed according to the invention presents another important advantage in the event that a failure occurs in the return or feedback loop of the servomechanism. In the event that such failure in the return loop occurs (a defect in the odometer, for example), whereby the comparator periodically becomes filled with information without any corrections being effected thereby, i.e., the amounts and directions of deviations from desired values vary during such periods, the output stage of the servomechanism undergoes oscillatory movements about a rest or null position whereby there cannot result any physical harm to or destruction of the mechanical parts of the servomechanism caused by their striking against a stop or like structure.

While there have been described what are considered to be preferred embodiments of the invention, it will be obvious to those skilled in the art that other modifications and changes may be made therein without departing from the invention and it is, accordingly, intended to cover all such modifications as fall within the spirit and scope of the invention.

What is claimed as new and desired to be secured by Letters Patent of the United States is:

1. In a servomechanism for controlling movement in utilization apparatus and comprising command means for producing pulses representing desired movement and position information, output movement control means, and feedback means for producing an error signal representing a deviation from said desired information: a pulse generator for producing first and second like pulse trains of the same frequency 180° displaced in phase with respect to each other; means for applying the outputs of said pulse generator to said command means for producing first and second command pulse trains respectively in phase with said second and first pulse trains and which represent positive and negative sense movement information; a first single directional counter having an output; a second single directional counter having an output, said first and second counters being alike; an addition stage; a subtraction stage; means for applying said first pulse train to said first counter; means for applying said first pulse train to said second counter through the series arrangement of said subtraction and said addition stages; a single flip-flop having an output, a set input and a reset input; means for applying the output of said first counter to one of the set and reset inputs of said flip-flop and for applying the output of said second counter to the other of the set and reset inputs of said flip-flop in staggered relation to produce a substantially linear output therefrom of rectangular waveform in accordance with the inputs thereto;

means for applying said last-named output to said movement control means; means responsive to said movement control means for producing first and second feedback pulse trains respectively in phase with said first and second pulse trains which represent positive and negative sense deviation movement information; and means for applying said first command and first feedback pulse trains to said subtraction stage and for applying said second command and second feedback pulse trains to said addition stage.

2. In a servomechanism as defined in claim 1 wherein there is further included phase discriminator means included in circuit between the output of said flip-flop and the input to said output movement control means for converting the output of said flip-flop to an analog signal.

3. In a servomechanism as defined in claim 2 and further including decoding means for discriminating between the senses of said feedback pulses.

4. In a servomechanism as defined in claim 3 wherein the positive sense command pulse train and negative sense feedback pulse train is fed in the phase of said second pulse train to said addition stage and wherein the negative sense command pulse train and the positive sense feedback pulse train is fed in the phase of said first pulse train to said subtraction stage.

5. In a servomechanism as defined in claim 4 wherein the outputs of said counters are respectively displaced in phase with respect to each other whereby said flip-flop is alternately actuated thereby, the output of said flip-flop being in accordance with the relative settings of said counters.

6. In a servomechanism as defined in claim 1 for controlled movements in a chosen plurality of coordinates, further comprising a third counter and a second flip-flop, each of said flip-flops having a set input and a reset input, and means for applying the output of one of said counters to the set input of one of said flip-flops and to the reset input of the other of said flip-flops and for applying the output of a different one of said counters to the rest input of said one of said flip-flops and for applying the output of a third one of said counters to the set input of the other of said flip-flops.

References Cited

UNITED STATES PATENTS

| | | | |
|---|---|---|---|
| 3,066,285 | 11/1962 | McCoy | 340—347 |
| 3,098,995 | 7/1963 | Mundt | 340—146.2 |
| 3,248,622 | 4/1966 | Kelling | 318—28 |

MALCOLM A. MORRISON, *Primary Examiner.*

ROBERT W. WEIG, *Assistant Examiner.*

U.S. Cl. X.R.

235—151.12; 318—162